United States Patent
Sasakawa et al.

(10) Patent No.: US 10,230,102 B2
(45) Date of Patent: Mar. 12, 2019

(54) POSITIVE ELECTRODE ACTIVE MATERIAL, NONAQUEOUS ELECTROLYTE BATTERY AND BATTERY PACK

(71) Applicant: Kabushiki Kaisha Toshiba, Minato-ku (JP)

(72) Inventors: Tetsuya Sasakawa, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 337 days.

(21) Appl. No.: 15/063,792

(22) Filed: Mar. 8, 2016

(65) Prior Publication Data

US 2016/0190569 A1    Jun. 30, 2016

Related U.S. Application Data

(63) Continuation of application No. PCT/JP2013/075594, filed on Sep. 20, 2013.

(51) Int. Cl.
    H01M 4/36       (2006.01)
    H01M 4/136      (2010.01)
    H01M 4/58       (2010.01)
    H01M 10/0525    (2010.01)

(52) U.S. Cl.
    CPC ........... *H01M 4/366* (2013.01); *H01M 4/136* (2013.01); *H01M 4/5825* (2013.01); *H01M 10/0525* (2013.01)

(58) Field of Classification Search
    CPC ..... H01M 4/366; H01M 4/136; H01M 4/5828
    See application file for complete search history.

(56) References Cited

U.S. PATENT DOCUMENTS

2008/0261113 A1    10/2008  Huang et al.
2011/0217598 A1*   9/2011   Kawashima .......... H01M 10/02
                                                       429/303
2012/0003529 A1    1/2012   Yamakaji
2012/0129050 A1    5/2012   Tarascon et al.
2013/0260210 A1*   10/2013  Takami ............. H01M 10/0525
                                                       429/156

FOREIGN PATENT DOCUMENTS

| JP | 2009-129721   | 6/2009  |
| JP | 2010-510631 A | 4/2010  |
| JP | 2011-210693   | 10/2011 |
| JP | 2012-33478    | 2/2012  |
| JP | 2013-69567    | 4/2013  |
| JP | 2013-84449    | 5/2013  |

OTHER PUBLICATIONS

International Search Report dated Nov. 12, 2013 in PCT/JP2013/075594, filed Sep. 20, 2013 (with English Translation).
Written Opinion dated Nov. 12, 2013 in PCT/JP2013/075594, filed Sep. 20, 2013.
Mohamed Ati et al. "Understanding and Promoting the Rapid Preparation of the Triplite-Phase of $LiFeSO_4F$ for Use as a Large-Potential Fe Cathode", Journal of the American Chemical Society, vol. 134, 2012, 8 pages.
P. Barpanda et al. "A 3.90 V Iron-Based Fluorosulphate Material for Lithium-Ion Batteries Crystallizing in the Triplite Structure", Nature Materials, vol. 10, Oct. 2011, 8 pages.
M. Ati et al. "Synthesis and Electrochemical Properties of Pure $LiFeSO_4F$ in the Triplite Structure", Electrochemistry Communications, vol. 13, 2011, 4 pages.

\* cited by examiner

*Primary Examiner* — Ula C Ruddock
*Assistant Examiner* — Thomas H. Parsons
(74) *Attorney, Agent, or Firm* — Oblon, McClelland, Maier & Neustadt, L.L.P.

(57) ABSTRACT

According to one embodiment, a positive electrode active material includes particles and a coating layer. The particles includes a first compound represented by the general formula $LiMSO_4F$ wherein M is at least one element selected from the group consisting of Fe, Mn, and Zn. The coating layer coats at least one part of surfaces of the particles. The coating layer includes a second compound represented by the general formula $LiM'PO_4$ wherein M' is at least one element selected from the group consisting of Fe, Mn, Co, and Mg.

13 Claims, 4 Drawing Sheets

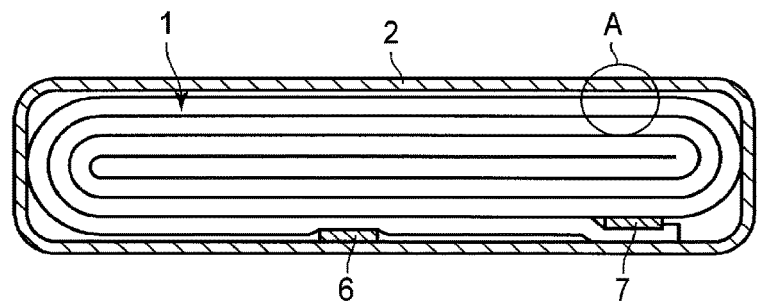
F I G. 1
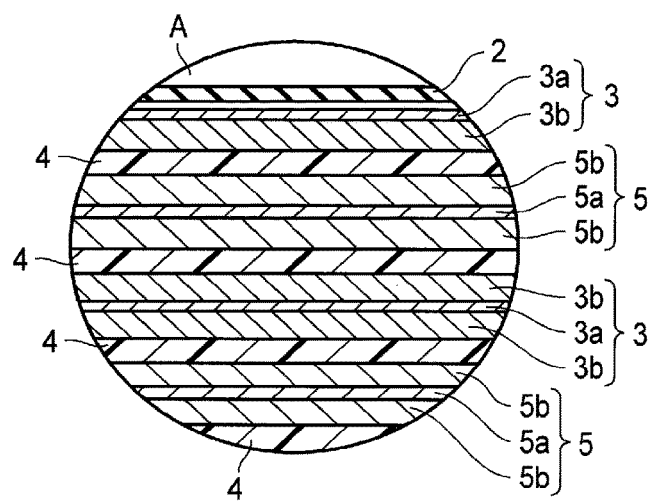
F I G. 2
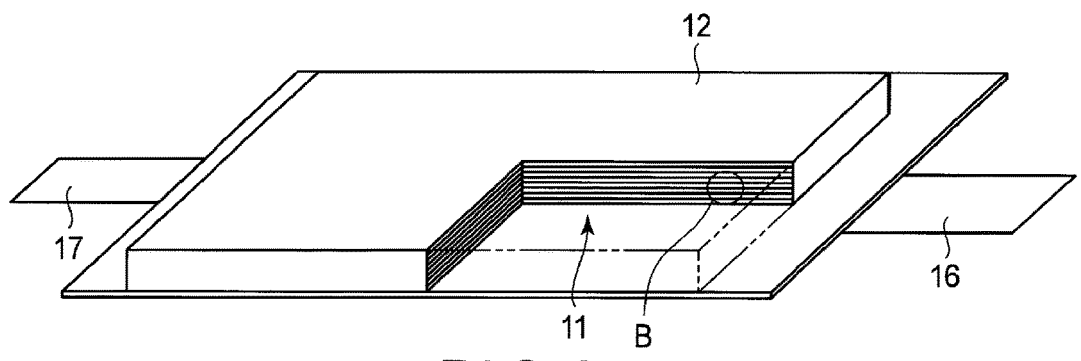
F I G. 3

POSITIVE ELECTRODE ACTIVE MATERIAL, NONAQUEOUS ELECTROLYTE BATTERY AND BATTERY PACK

CROSS-REFERENCE TO RELATED APPLICATIONS

This application is a Continuation Application of PCT Application No. PCT/JP2013/075594, filed Sep. 20, 2013, the entire contents of which are incorporated herein by reference.

FIELD

Embodiments described herein relate generally to a positive electrode active material, a nonaqueous electrolyte battery and a battery pack.

BACKGROUND

Along with advances in applications of lithium ion secondary batteries in electric cars and hybrid electric cars, it is required to attain a higher energy density. Currently, $LiFePO_4$ and the like are put to practical use as a positive electrode material having high safety, but the average operation potential thereof is low, i.e., 3.4 V based on Li. A positive electrode active material having a higher operation potential is essential to attain a higher energy density of a lithium ion secondary battery.

Recently, $Li(Fe, Mn)SO_4F$ of a Tavorite type or triplite type crystal structure has been widely studied as a positive electrode material capable of meeting the requirement described above. The Tavorite type $Li(Fe, Mn)SO_4F$ has an average operation potential of 3.6 V (vs. $Li/Li^+$) and the triplite type $Li(Fe, Mn)SO_4F$ has an average operation potential of 3.9 V (vs. $Li/Li^+$), and thus are promising as a next-generation secondary battery positive electrode material having a high energy density. These positive electrode materials, however, have a high deliquescence, and thus have a defect in which their properties are degraded due to moisture in the air in production of a battery, or moisture generated inside a battery.

BRIEF DESCRIPTION OF DRAWINGS

FIG. 1 is a cross-sectional view showing a flat-shaped nonaqueous electrolyte battery according to a first embodiment.

FIG. 2 is an enlarged cross-sectional view showing part A in FIG. 1.

FIG. 3 is a partially cut perspective view showing schematically another flat-shaped nonaqueous electrolyte battery according to the first embodiment.

DETAILED DESCRIPTION

First Embodiment

Figure 4:
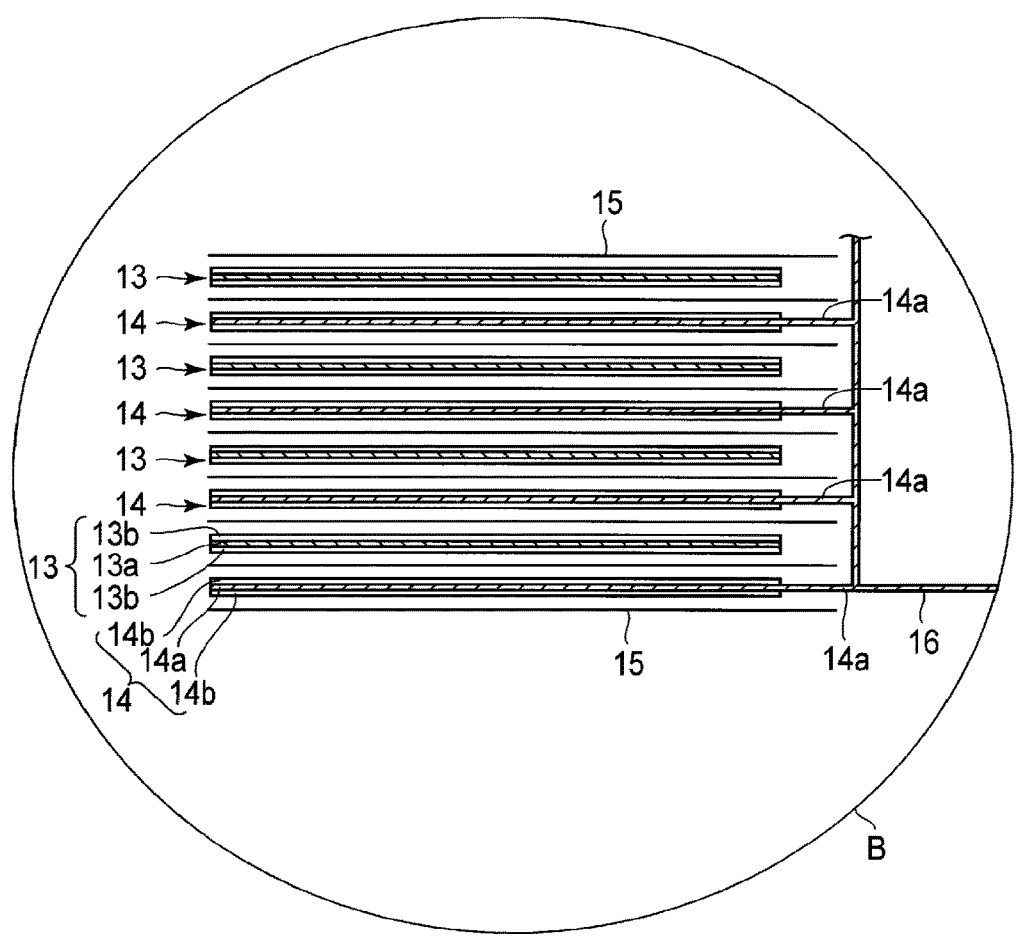
FIG. 4 is an enlarged cross-sectional view showing part B in FIG. 3.

According to the first embodiment, a positive electrode active material containing particles and a coating layer is provided. The particles contain a first compound represented by the general formula $LiMSO_4F$ wherein M is at least one element selected form the group consisting of Fe, Mn and Zn. The element can be of one kind or two kinds or more. The coating layer coats at least one part of the surfaces of the particles. The coating layer contains a second compound represented by the general formula $LiM'PO_4$ wherein M' is at least one element selected from the group consisting of Fe, Mn, Co and Mg. The element can be of one kind or two kinds or more. The second compound has an olivine type crystal structure.

The coating layer can suppress the reaction of the first compound with moisture in an atmosphere, and thus the positive electrode active material can avoid deliquescence. As the lithium or lithium ion is inserted into and/or extracted from the second compound contained in the coating layer, the coating layer functions as a positive electrode active material layer, and the lithium or lithium ion is supplied through the coating layer into the first compound. The coating layer, accordingly, can avoid deliquescence of the positive electrode active material without disturbing the insertion and extraction reaction of lithium (or lithium ion) by the first compound. Consequently, a nonaqueous electrolyte battery containing the positive electrode active material according to the embodiment can realize an excellent charge and discharge cycle performance.

When the first compound has the Tavorite type crystal structure, its average operation potential is 3.6 V based on Li (vs. $Li/Li^+$). When the first compound has the triplite type crystal structure, its average operation potential is 3.9 V (vs. $Li/Li^+$). The second compound has an average operation potential of 3.4 to 4.0 V (vs. $Li/Li^+$), and in a case of $LiFePO_4$, the average operation potential is 3.4 V (vs. $Li/Li^+$). The average operation potential of the second compound is almost the same as that of the first compound. In the discharge of the nonaqueous electrolyte battery, first, an insertion reaction of lithium (or lithium ion) by the first compound occurs, then an insertion reaction of lithium (or lithium ion) by the second compound occurs, and then the discharge is finished. The charge and discharge reaction by the first compound mainly occurs, and thus the high potential of the positive electrode can be maintained. As a result, the nonaqueous electrolyte battery having a high energy density can be realized.

According to the embodiment, accordingly, the positive electrode active material can be provided which has a suppressed deliquescence reaction and can improve the energy density and charge and discharge cycle performance of the nonaqueous electrolyte battery.

The positive electrode active material is explained in more detail below.

In order to prevent deliquescence of the positive electrode active material, the coating layer desirably coats the whole surface of the particle. It also is desirable that the amount of the coating layer is adjusted to 0.5% by mass or more and 20% by mass or less based on 100% by mass of the positive electrode active material. When the amount of coating layer is adjusted to 0.5% by mass or more, deterioration of the charge and discharge performance caused by deliquescence of the positive electrode active material can be prevented. The larger the amount of the coating layer, the higher the effect of preventing deliquescence of the positive electrode active material, but the percentage of the second compound having a low average operation potential is increased, thus resulting in occurrence of a risk of the operation potential of the positive electrode lowering. When the amount of the coating layer is 20% by mass or less, a high positive electrode potential can be realized. The amount of the coating layer is more preferably in a range of 1% by mass or more and 20% by mass or less.

In order to improve an electroconductivity of the positive electrode active material, at least one part of the surface of the positive electrode active material may be coated with a carbon-containing layer. It is desirable to form the carbon-containing layer on at least one part of the coating layer. The carbon material contained in the carbon-containing layer may include, for example, at least one material selected from the group consisting of acetylene black, carbon black and graphite. The carbon material can be of one kind or two kinds or more.

The particles desirably have an average particle size (excluding the coating layer) in a range of 0.1 µm or more and 10 µm or less. When the average particle size is adjusted to 0.1 µm or more, the positive electrode active material has an appropriate size of a specific surface area, and thus the effect of preventing the reaction of the first compound with moisture in an atmosphere can be improved. When the average particle size is adjusted to 10 µm or less, a diffusion speed of lithium (or lithium ion) in the particle is increased, and thus a high discharge capacity can be obtained. The average particle size is more preferably in a range of 0.1 µm or more and 1 µm or less.

The coating layer has desirably a thickness in a range of 1 nm or more and 1 µm or less. When the thickness is adjusted to 1 nm or more, the effect of preventing deliquescence of the positive electrode active material can be improved. As the lithium or lithium ion is inserted into and/or extracted from the particles through the coating layer, the thickness of 1 µm or less can make smooth the insertion and extraction of the lithium (or lithium ion) by the positive electrode active material. The thickness is more preferably in a range of 10 nm or more and 100 nm or less.

The average particle size of the particles and the thickness of the coating layer can be measured by transmission electron microscope (TEM) observation. For example, when the positive electrode is measured, the TEM observation is performed on a slice of the positive electrode active material, obtained by applying focused ion beams to the positive electrode, at a magnification of 100,000 times, and the particle sizes thereof and the thickness of the coating layer are measured using the obtained images. The measurement is performed for at least 10 arbitrary points and an average value of the 10 points is found.

The positive electrode active material is synthesized, for example, in a method described below. First, a sulfate hydrate of a transition metal and lithium flouoride are enclosed in a sealed container, which is heated at a temperature in a range of 250° C. or higher and 300° C. or lower, thereby synthesizing particles containing the first compound. The transition metal contains at least one element of the same element of M contained in the first compound, i.e., at least one element selected from the group consisting of Fe, Mn and Zn. When only Fe is used as M, $LiFeSO_4F$ has the tavorite type crystal structure, and has an average operation potential of 3.6 V (vs. $Li/Li^+$). When Fe:Mn in a ratio of 9:1 or Fe:Zn in a ratio of 9:1 are used as M, the crystal structure is the triplite type and the average operation potential is 3.9 V (vs. $Li/Li^+$).

A nonaqueous solvent (such as an organic solvent, ion liquid, or the like) is added to the obtained particles containing the first compound, a sulfate hydrate of M' (M' is at least one element selected from the group consisting of Fe, Mn, Co and Mg), and lithium phosphate, and the mixture is enclosed in the sealed container, which is heated at a temperature in a range of 150° C. or higher and 350° C. or lower, thereby obtaining a positive electrode active material in which the surface of the particles containing the first compound is coated with the coating layer containing the second compound.

According to the positive electrode active material of the first embodiment, at least one part of the surfaces of the particles containing the first compound is coated with the coating layer containing the second compound, and thus the deliquescence reaction is suppressed and a positive electrode active material capable of improving the discharge capacity and the charge and discharge cycle performance of the nonaqueous electrolyte battery can be provided.

Second Embodiment

According to a second embodiment, a nonaqueous electrolyte battery containing a positive electrode, a negative electrode, and a nonaqueous electrolyte is provided. The positive electrode contains the positive electrode active material according to the first embodiment. The nonaqueous electrolyte battery also contains a separator located between the positive electrode and the negative electrode, and a container member. The container member houses the positive electrode, the negative electrode, the separator, and the nonaqueous electrolyte.

The positive electrode, the negative electrode, the nonaqueous electrolyte, the separator, and the container member are explained below.

1) Positive Electrode

The positive electrode contains a positive electrode current collector, and a positive electrode material layer(s) (a positive electrode active material-containing layer(s)) formed on one side or both sides of the positive electrode current collector and containing the positive electrode active material, a conductive agent, and a binder.

The positive electrode active material of the first embodiment can be used as the active material. One or more kinds of positive electrode active material can be used.

The conductive agent improves the current collecting performance of the active material and suppresses the contact resistance with the current collector. Examples of the conductive agent may include a carbonaceous material such as acetylene black, carbon black, and graphite. One or more kinds of conductive agent can be used.

The binder binds the active material to the conductive agent. Examples of the binder may include polytetrafluoroethylene (PTFE), polyvinylidene fluoride (PVdF) and fluororubber. One or more kinds of binder can be used.

It is preferable that the active material, the conductive agent, and the binder in the positive electrode material layer are contained in contents of, respectively, 80% by mass or more and 95% by mass or less, 3% by mass or more and 18% by mass or less, and 2% by mass or more and 17% by mass or less. When the content of the conductive agent is adjusted to 3% by mass or more, the effects described above can be exhibited. When the content of the conductive agent is adjusted to 18% by mass or less, the decomposition of the nonaqueous electrolyte can be reduced on the surface of the conductive agent in high temperature storage. When the content of the binder is adjusted to 2% by mass or more, sufficient positive electrode strength can be obtained. When the content of the binder is adjusted to 17% by mass or less, the binder, which is an insulating material in the positive electrode, is decreased, and an internal resistance can be reduced.

The positive electrode current collector is preferably, for example, an aluminum foil, or an aluminum alloy foil containing at least one element selected from the group consisting of Mg, Ti, Zn, Mn, Fe, Cu and Si. The element can be of one kind or two kinds or more.

The positive electrode is produced, for example, by suspending the positive electrode active material, the conductive agent, and the binder in a generally used solvent to prepare a slurry, coating the positive electrode current collector with the slurry, and drying and pressing it. The positive electrode may also be produced by molding the positive electrode active material, the conductive agent, and the binder into pellets to obtain the positive electrode material layer, and stacking the positive electrode material layer on the positive electrode current collector.

2) Negative Electrode

The negative electrode contains a negative electrode current collector, and a negative electrode material layer(s) (a negative electrode active material-containing layer(s)) formed on one side or both sides of the negative electrode current collector and containing a negative electrode active material, a conductive agent, and a binder.

Examples of the negative electrode active material may include a carbonaceous material capable of absorbing (or inserting) and releasing (or extracting) lithium ion, metal oxides, metal sulfides, metal nitrides, metals, and alloys. One or more kinds of the negative electrode active material can be used.

The metal oxide is preferably a titanium-containing metal oxide. Examples of the titanium-containing metal oxide may include lithium-titanium oxides, titanium oxides, and niobium-titanium composite oxides.

Examples of the lithium-titanium oxide may include $Li_{4+x}Ti_5O_{12}$ wherein x is $-1 \leq x \leq 3$ and has a spinel structure, and $Li_{2+x}Ti_3O_7$ wherein x is $-1 \leq x \leq 3$ and has a ramsdellite structure Examples of the titanium oxide may include $TiO_2$ having an anatase structure, and monoclinic $TiO_2(B)$. It is preferable that $TiO_2(B)$ is heat-treated at a temperature in a range of 300 to 500° C. It is preferable that $TiO_2(B)$ contains 0.5 to 10% by weight of Nb, whereby the negative electrode capacity can be increased. In the titanium oxide after the battery is charged and discharged, irreversible lithium may remain, and thus the titanium oxide after the charge and discharge can be expressed by $Li_dTiO_2$ wherein $0<d \leq 1$.

Examples of the niobium-titanium composite oxide may include $Li_xNb_aTi_bO_c$ wherein $0 \leq x \leq 3$, $0<a \leq 3$, $0<b \leq 3$, and $5 \leq c \leq 10$. Examples of $Li_xNb_aTi_bO_c$ may include $Li_xNb_2TiO_7$, $LixNb_2Ti_2O_9$, $Li_xNbTiO_5$. $Li_xTi_{1-y}Nb_yNb_2O_{7+\sigma}$ wherein $0 \leq x \leq 3$, $0 \leq y \leq 1$, and $0 \leq \sigma \leq 0.3$, which is heat-treated at 800° C. to 1200° C., has a high real density, and a capacity per unit volume can be increased. $Li_xNb_2TiO_7$ is preferable because it has a high density and a high capacity, whereby the negative electrode capacity can be increased. A part of Nb atoms or Ti atoms in the oxides described above may be substituted by at least one element selected from the group consisting of V, Zr, Ta, Cr, Mo, W, Ca, Mg, Al, Fe, Si, B, P, K, and Na. The element can be of one kind or two kinds or more.

The lithium-titanium oxide particles easily adsorb moisture on the surface thereof. This tendency is especially strong in lithium-titanium oxide particles having the spinel structure. For that reason, if the surface of the particles containing the first compound is not coated with the coating layer containing the second compound, and the lithium-titanium oxide particles are used as the negative electrode active material, it is necessary that a dew point of an atmosphere in which a battery is produced is strictly managed and a moisture amount in the atmosphere is controlled.

Even if the management is strictly performed, however, when the coating layer is not used, the first compound causes deliquescence. When the positive electrode active material according to the first embodiment is used, it is not required to strictly manage the moisture amount in the production atmosphere in which the negative electrode active material containing the lithium-titanium oxide particles are used. When the positive electrode active material according to the first embodiment is used, accordingly, the mass productivity and the cost can be improved in the production of electrodes and batteries.

The conductive agent increases the current collecting performance of the negative electrode active material and suppresses the contact resistance of the negative electrode current collector. Examples of the conductive agent may include acetylene black, carbon black, and graphite. One or more kinds of conductive agent can be used.

The binder can bind the negative electrode active material to the conductive agent. Examples of the binder may include polytetrafluoroethylene (PTFE), polyvinylidene fluoride (PVdF), fluororubber, and styrene butadiene rubber. One or more kinds of binder can be used.

It is preferable that the negative electrode active material, the conductive agent, and the binder in the negative electrode material layer are respectively contained in contents of 70% by mass or more and 96% by mass or less, 2% by mass or more and 28% by mass or less, and 2% by mass or more and 28% by mass or less. When the amount of the conductive agent is adjusted to 2% by mass or more, the current collecting performance of the negative electrode material layer can be improved, and the large current characteristic of the nonaqueous electrolyte battery can be improved. When the amount of the binder is adjusted to 2% by mass or more, the binding property between the negative electrode material layer and the current collector is increased, and the cycle characteristic can be improved. On the other hand, 28% by mass or less of the amount of the conductive agent or the binder is preferable in order to increase the capacity.

The negative electrode current collector is preferably an aluminum foil or an aluminum alloy foil containing at least one element selected from the group consisting of Mg, Ti, Zn, Mn, Fe, Cu and Si, which are electrochemically stable in a potential range nobler than 1 V (vs. $Li/Li^+$). The element can be of one kind or two kinds or more.

The negative electrode is produced, for example, by suspending the negative electrode active material, the conductive agent, and the binder in a generally used solvent to prepare a slurry, coating the negative electrode current collector with the slurry, and drying and pressing it. The negative electrode may also be produced by molding the negative electrode active material, the conductive agent, and the binder into pellets to obtain the negative electrode material layer, and stacking the negative electrode material layer on the negative electrode current collector.

3) Nonaqueous Electrolyte

As the nonaqueous electrolyte, for example, liquid nonaqueous electrolyte, produced by dissolving an electrolyte in an organic solvent, or a gel nonaqueous electrolyte in which the liquid electrolyte and a polymer material are combined, may be used.

It is preferable that in the liquid nonaqueous electrolyte the electrolyte is dissolved in an organic solvent in a concentration of 0.5 M or more and 2.5 M or less.

Examples of the electrolyte may include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate (LiCF$_3$SO$_3$), and bis-trifluoromethyl sulfonyl imide lithium [LiN(CF$_3$SO$_2$)$_2$]; and mixtures thereof. The electrolyte can be of one kind or two kinds or more. Electrolytes which are not easily oxidized even at a high potential are preferable, and LiPF$_6$ is most preferable.

Examples of the organic solvent may include cyclic carbonates such as propylene carbonate (PC), ethylene carbonate (EC), or vinylene carbonate; linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxyethane (DME) or diethoxyethane (DEE); γ-butyrolactone (GBL), acetonitrile (AN), and sulfolane (SL). These organic solvents can be used alone or in the form of a mixed solvent.

Examples of the polymer material may include polyvinylidene fluoride (PVdF), polyacrylonitrile (PAN), and polyethylene oxide (PEO).

Preferable organic solvents are mixed solvents in which at least two solvents from the group consisting of propylene carbonate (PC), ethylene carbonate (EC), and diethyl carbonate (DEC) are mixed, and mixed solvents containing γ-butyrolactone (GBL). When these mixed solvent are used, the nonaqueous electrolyte battery having an excellent high temperature property can be obtained.

4) Separator

As the separator, for example, a porous film or a synthetic resin non-woven fabric may be used. Examples of the material forming the separator may include at least one selected from the group consisting of polyethylene, polypropylene, cellulose, and polyvinylidene fluoride (PVdF). The porous film containing polyethylene or polypropylene is melted at a given temperature and can cut off an electric current, and thus the safety can be improved.

5) Container Member

The container member is formed from a laminated film having a thickness of 0.5 mm or less, or uses a metal container having a wall thickness of 1 mm or less. The metal container has preferably a wall thickness of 0.5 mm or less The shape of the container member can be selected from a flat (thin) shape, a prismatic shape, a cylindrical shape, a coin shape, and a button shape. Examples of the container member may include a container member for a compact battery mounted on a mobile electronic device, or a container member for a large-sized battery mounted on a two- to four-wheeled vehicle, and the like, depending on the battery size.

As the laminated film, a multilayer film in which a metal layer is disposed between resin layers is used. The metal layer is preferably an aluminum foil or an aluminum alloy foil for weight reduction. As the resin layer, one or more polymer materials, for example, selected from polypropylene (PP), polyethylene (PE), nylon, and polyethylene terephthalate (PET) may be used. The laminated film is heat-sealed, whereby the shape of the container member can be formed.

The metal container is fabricated from aluminum, aluminum alloy, or the like. The aluminum alloy contains preferably one or more elements selected from magnesium, zinc, and silicon. When the alloy contains one or more transition metals such as iron, copper, nickel and chromium, it is preferable to adjust the content thereof to 100 ppm by mass or less.

The nonaqueous electrolyte battery according to the second embodiment is specifically explained referring to the drawings. FIG. 1 is a cross-sectional view showing a flat-shaped nonaqueous electrolyte secondary battery. FIG. 2 is an enlarged cross-sectional view showing part A in FIG. 1. Each drawing is a schematic drawing to aid in explaining and understanding the embodiment, and shapes, sizes and ratios in the drawing are different from an actual apparatus, but they can be appropriately changed in light of the explanations below and known technology.

A flat-shaped wound electrode group 1 is housed in a bag-shaped container member 2 formed from a laminated film in which a metal layer is disposed between two resin layers. The flat-shaped wound electrode group 1 is formed, as shown in FIG. 2, by spirally winding a laminate in which a negative electrode 3, a separator 4, a positive electrode 5, and a separator 4 are laminated in this order from the outside, and press-molding the wound laminate.

The negative electrode 3 contains a negative electrode current collector 3a and negative electrode active material-containing layers 3b. As shown in FIG. 2, the outermost layer of the negative electrode 3 has a structure in which the negative electrode active material-containing layer 3b is formed on one side of an inner surface of the negative electrode current collector 3a. In the other negative electrodes 3, the negative electrode active material-containing layers 3b are formed on both sides of the negative electrode current collector 3a. In the positive electrode 5, positive electrode active material-containing layers 5b are formed on both sides of a positive electrode current collector 5a.

As shown in FIG. 1, the negative electrode terminal 6 is connected to the negative electrode current collector 3a of the outermost layer of negative electrode 3, and the positive electrode terminal 7 is connected to the positive electrode current collector 5a of the inside of the positive electrode 5, in the vicinity of an outer peripheral edge of the wound electrode group 1. The negative electrode terminal 6 and the positive electrode terminal 7 are extended from an opening of the bag-shaped container member 2 to the outside. For example, a liquid nonaqueous electrolyte is poured into the bag-shaped container member 2 through an opening thereof. The opening of the bag-shaped container member 2 is heat-sealed in a state in which the negative electrode terminal 6 and the positive electrode terminal 7 are put therein, whereby the wound electrode group 1 and the liquid nonaqueous electrolyte are sealed.

The negative electrode terminal can be formed from a material which is electrochemically stable at the absorption (or insertion) and the release (or extraction) potential of the negative electrode active material, and has an electric conductivity. Specifically, the material may include copper, nickel, stainless steel, aluminum, aluminum alloy containing one or more elements selected from the group consisting of Mg, Ti, Zn, Mn, Fe, Cu and Si, and the like. It is preferable that the negative electrode terminal is formed from the same material as that of the negative electrode current collector, in order to reduce the contact resistance with the negative electrode current collector.

The positive electrode terminal is preferably formed from a material having an electric stability and an electric conductivity in a potential range of 3 V or more and 5 V or less, preferably 3 V or more and 4.25 V or less to the lithium ion or metal. Specifically, it is exemplified by aluminum, aluminum alloy containing one or more elements selected from the group consisting of Mg, Ti, Zn, Ni, Cr, Mn, Fe, Cu and Si, and the like. It is preferable that the positive electrode terminal is formed from the same material as that of the positive electrode current collector, in order to reduce the contact resistance with the positive electrode current collector.

The nonaqueous electrolyte battery according to the second embodiment is not limited to the nonaqueous electrolyte battery shown in FIG. 1 and FIG. 2, and may be a battery having a structure, for example, shown in FIG. 3 and FIG. 4. FIG. 3 is a partially cut perspective view schematically showing a nonaqueous electrolyte battery of another example according to the second embodiment; and FIG. 4 is an enlarged cross-sectional view showing part B in FIG. 3.

A laminated electrode group 11 is housed in a container member 12 formed from a laminated film in which a metal layer is disposed between two resin films. The electrode group 11 is, as shown in FIG. 4, a structure in which the positive electrodes 13 and the negative electrodes 14 are alternately laminated, the separators 15 being disposed between them. There are plural positive electrodes 13, and each of them contains a positive electrode current collector 13a, and positive electrode layers 13b carried on both sides of the positive electrode current collector 13a. There are plural negative electrodes 14, and each of them contains a negative electrode current collector 14a, and negative electrode current collectors 14a carried on both sides of the negative electrode active material-containing layer 14b. In the negative electrode current collector 14a of each negative electrode 14, one side thereof protrudes from the negative electrode 14. The protruding negative electrode current collector 14a is electrically connected to a belt-shaped negative electrode terminal 16. The end of the belt-shaped negative electrode terminal 16 is drawn out from the container member 11. In the positive electrode current collector 13a of the positive electrode 13, a side positioned on the opposite side to the protruding side of the negative electrode current collector 14a protrudes from the positive electrode 13, which is not shown, though. The positive electrode current collector 13a protruding from the positive electrode 13 is electrically connected to a belt-shaped positive electrode terminal 17. The end of the belt-shaped positive electrode terminal 17 is positioned on the opposite side to the negative electrode terminal 16, and is drawn out from a side of the container member 11.

According to the second embodiment described above, a nonaqueous electrolyte battery having an improved discharge capacity and charge and discharge cycle performance can be realized, because it contains the positive electrode active material of the first embodiment.

Third Embodiment

A battery pack according to a third embodiment is explained by referring to the drawings. The battery pack according to the third embodiment has one or more nonaqueous electrolyte batteries (unit cells) according to the second embodiment. When the battery pack contains plural unit cells, each unit cell is disposed and connected electrically in series or in parallel. It is desirable that the battery pack further contains a protective circuit capable of detecting a voltage of the nonaqueous electrolyte battery.

Figure 5:
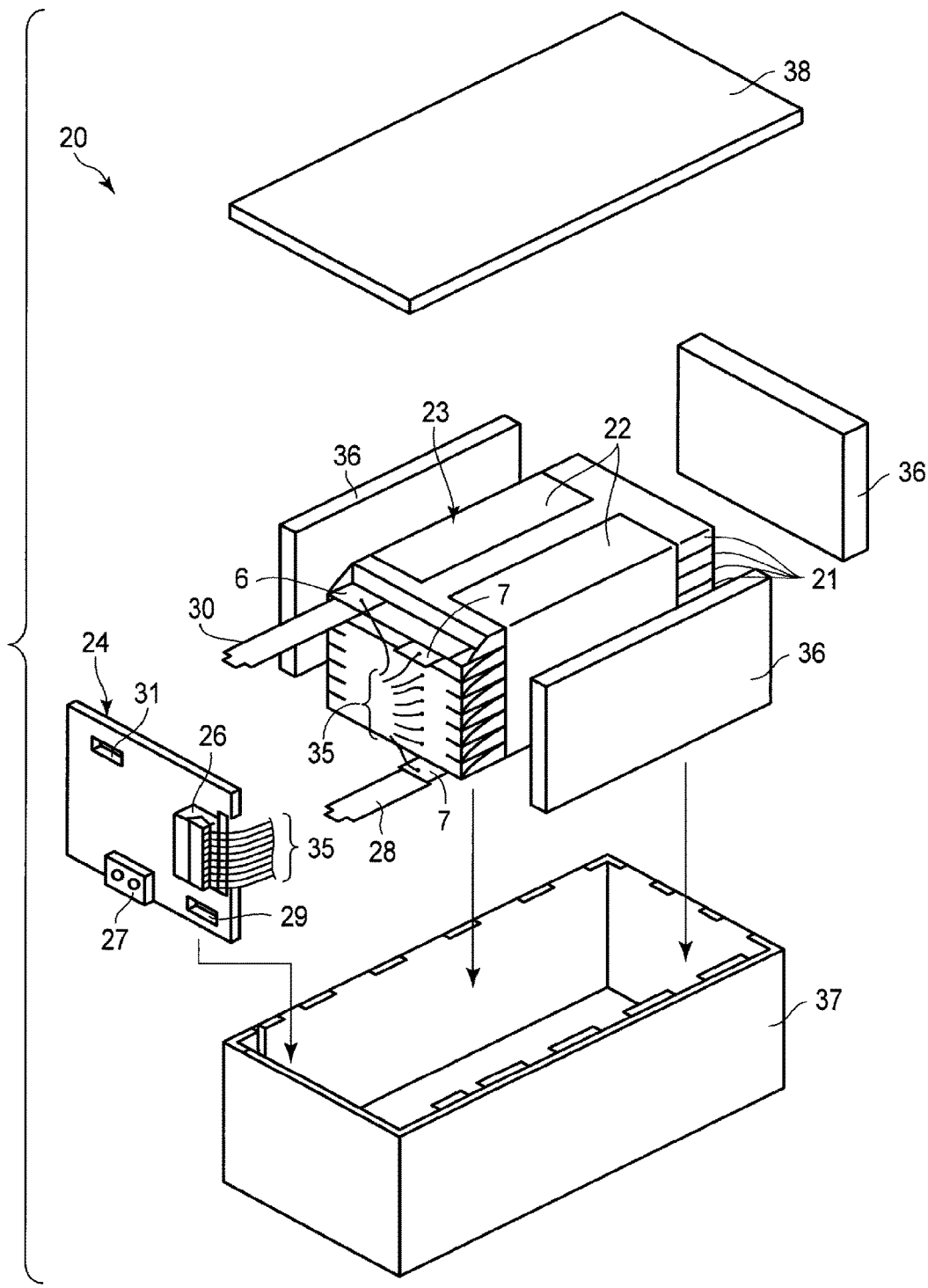
FIG. 5 is an exploded perspective view showing a battery pack according to a second embodiment.
Figure 6:
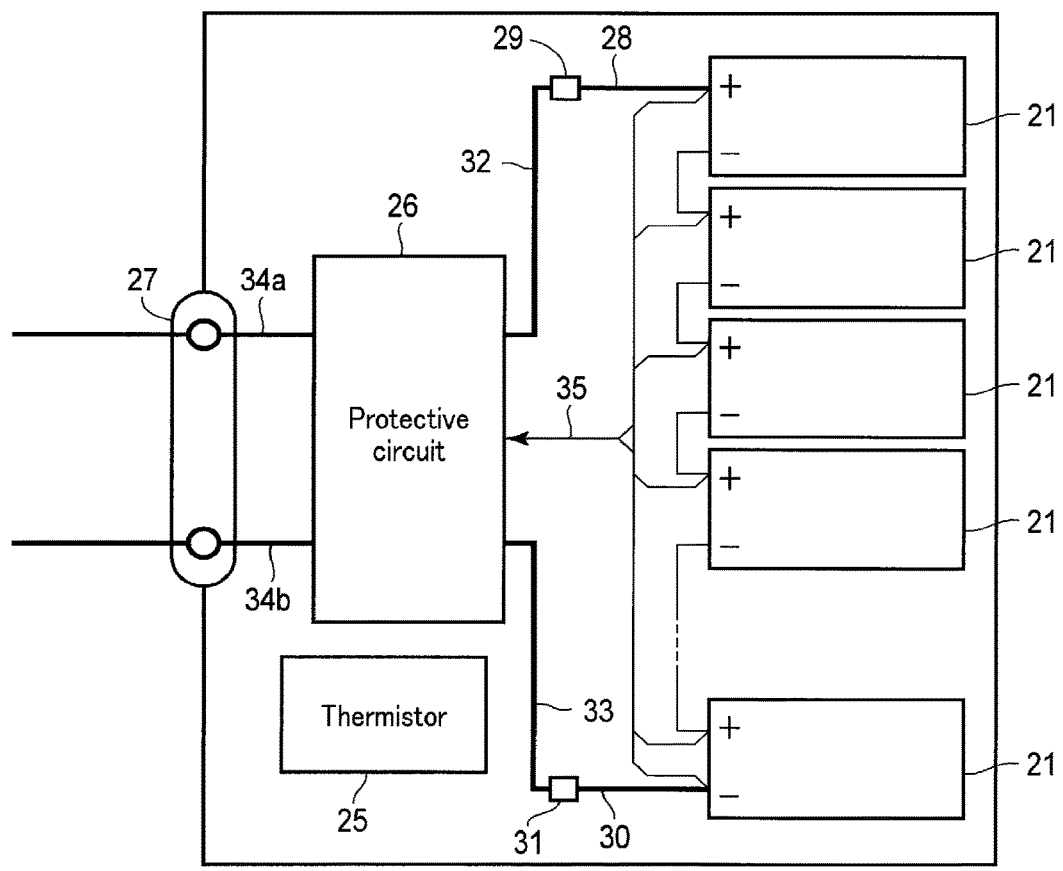
FIG. 6 is a block diagram showing an electric circuit of the battery pack of FIG. 5.

FIG. 5 and FIG. 6 show one example of a battery pack 20. The battery pack 20 contains plural flat-shaped batteries 21 having a structure shown in FIG. 1. FIG. 5 is an exploded perspective view showing the battery pack 20; and FIG. 6 is a block diagram showing an electric circuit of the battery pack 20 in FIG. 5.

Plural unit cells 21 are laminated so that a negative electrode terminal 6 and a positive electrode terminal 7, which extend to the outside, are arranged in the same direction, and the resulting laminate is bonded with a pressure-sensitive adhesive tape 22 to form a battery module 23. These unit cells 21 are as shown in FIG. 6, electrically connected to each other in series.

A printed wiring board 24 is disposed facing side faces of the unit cells 21 from which the negative electrode terminal 6 and the positive electrode terminal 7 extend. On the printed wiring board 24, as shown in FIG. 6, a thermistor 25, a protective circuit 26, and a terminal 27 for passing electricity to an external device are mounted. An insulating plate (not shown) is attached to a surface of the printed wiring board 24 facing the battery module 23, in order to avoid accidental connections with the electrical wiring of the battery module 23.

A positive electrode lead 28 is connected to the positive electrode terminal 7 positioned in the undermost layer of the battery module 23, and the end thereof is inserted into a positive electrode connector 29 of the printed wiring board 24 to form an electrical connection. A negative electrode lead 30 is connected to the negative electrode terminal 6 positioned in the top layer of the battery module 23, and an end thereof is inserted into a negative electrode connector 31 of the printed wiring board 24 to form an electrical connection. The connectors 29 and 31 are connected to the protective circuit 26 through wirings 32 and 33 formed on the printed wiring board 24.

The thermistor 25 detects a temperature of the unit cells 21, and the detection signals are transmitted to the protective circuit 26. The protective circuit 26 can block a plus wiring 34a and a minus wiring 34b between the protective circuit 26 and the terminal 27 for passing electricity to an external device in a pre-determined condition. The pre-determined condition may include, for example, a condition in which a temperature detected by the thermistor 25 reaches a pre-determined temperature or higher. In addition, a case where over-charge, over-discharge, or over current of the unit cells 21 is detected may be exemplified as the pre-determined condition. The detection of the over-charge, or the like, is performed for individual unit cells 21 or the battery module. When the detection of the individual unit cell 21 is performed, the battery voltage may be detected, or the positive electrode potential or the negative electrode potential may be detected. In the latter case, a lithium electrode, which is used as a reference electrode, is inserted into the individual unit cell 21. In the case of FIG. 5 and FIG. 6, a wiring 35 is connected to each of the unit cells 21 for detecting a voltage, and detection signals are transmitted to the protective circuit 26 through the wirings 35.

Protective sheets 36, formed of rubber or a resin, are disposed at three sides of the battery module 23, except for a side from which the positive electrode terminal 7 and the negative electrode terminal 6 protrude.

The battery module 23 is housed in a housing container 37 together with each protective sheet 36 and the printed wiring board 24; that is, the protective sheets 36 are disposed on both long-side inner surfaces of the housing container 37 and on one of short-side inner surfaces, and the printed wiring board 24 is disposed on the other side of the short-side inner surfaces. The battery module 23 is positioned in a space surrounded by the protective sheets 36 and the printed wiring board 24. A lid 38 is attached to a top surface of the housing container 37.

For fixation of the battery module 23, a heat-shrinkable tape may be used instead of the pressure-sensitive adhesive tape 22. In this case, the protective sheets are put on both sides of the battery module, the heat-shrinkable tape is wound around it, and then the heat-shrinkable tape is heat-shrunk to bundle the battery module.

FIG. 5 and FIG. 6 show the form in which the unit cells 21 are connected in series, but the unit cells may be connected in parallel, in order to increase the battery capacity. Alternatively, the connection in series and the connection in parallel may be combined. Assembled battery packs may be further connected in series or in parallel.

Aspects of the battery pack may be appropriately modified depending on the application. The battery pack is preferably used in an application requiring excellent cycle characteristics at a large current. Specifically, it is used, for example, as a power source for digital cameras, a battery mounted on a two- to four-wheeled hybrid electric car, two- to four-wheeled electric car, and an electric assist bicycle. In particular, it is preferably used as a battery mounted on vehicles.

According to the third embodiment, a battery pack having a high capacity and excellent charge and discharge cycle performance can be provided, because the battery pack contains the nonaqueous electrolyte battery of the second embodiment.

EXAMPLE

Examples are explained in detail below.

Example 1

As a transition metal sulfate hydrate, $FeSO_4 \cdot H_2O$ and LiF were enclosed in a sealed container, which was heated at 300° C. for 3 days to synthesize tavorite type $LiFeSO_4F$ particles. 1-ethyl-3-methylimidazolium-bis(trifluoromethanesulfonyl)imide which was a nonaqueous solvent was added to the obtained $LiFeSO_4F$ particles, $FeSO_4 \cdot 7H_2O$, which was a sulfate hydrate of Fe, and $Li_3PO_4$. The mixture was enclosed in a sealed container, which was heated at 150° C. to coat the surface of the $LiFeSO_4F$ particles with the $LiFePO_4$ layer, thereby obtaining a positive electrode active material.

The material had 97% by mass of the $LiFeSO_4F$ particles and 3% by mass of the $LiFePO_4$ layer based on 100% by mass of the positive electrode active material.

Examples 2 to 5

A positive electrode active material was obtained in the same manner as in Example 1 except that the average particle size of the particles, and the thickness of the coating layer were changed to those shown in Table 1 below.

Examples 6 and 7

A positive electrode active material was obtained in the same manner as in Example 1 except that, as the sulfate hydrate of a transition metal, $Fe_{0.9}Mn_{0.1}SO_4 \cdot H_2O$ in Example 6 or $Fe_{0.9}Zn_{0.1}SO_4 \cdot H_2O$ in Example 7 was used.

Examples 8 to 10

A positive electrode active material particles were obtained in the same manner as in Example 1 except that, as the sulfate hydrate of Fe, $FeSO_4 \cdot 7H_2O$ and $MnSO_4 \cdot 5H_2O$ in Example 8, $FeSO_4 \cdot 7H_2O$ and $CoSO_4 \cdot 7H_2O$ in Example 9, or $FeSO_4 \cdot 7H_2O$ and $MgSO_4 \cdot 7H_2O$ in Example 10 were used.

Example 11

Acetylene black was added to the positive electrode active material particles obtained in Example 1 in an amount of 2% by weight based on the positive electrode active material, and they were mixed in a ball mill to form a carbon coating film on the surfaces of the positive electrode active material particles.

Comparative Example 1

A positive electrode active material was produced by using tavorite type $LiFeSO_4F$ particles as the active material of the general formula $LiMSO_4F$, in which the coating on the surface was not performed.

Comparative Example 2

A positive electrode active material was produced by using $LiFe_{0.9}Mn_{0.1}SO_4F$ as the active material of the general formula $LiMSO_4F$, in which the coating on the surface was not performed.

Comparative Example 3

A positive electrode active material was produced by using $LiFe_{0.9}Zn_{0.1}SO_4F$ as the active material of the general formula $LiMSO_4F$, in which the coating on the surface was not performed.

Comparative Example 4

A mixture of 97 parts by mass of tavorite type $LiFeSO_4F$ particles and 3 parts by mass of $LiFePO_4$ particles was prepared as the positive electrode active material.

Comparative Example 5

$Li_2CO_3$ and $Co_2O_3$ were added to tavorite type $LiFeSO_4F$ particles synthesized in the same manner as in Example 1, and the mixture was heated at 800° C. in an Ar atmosphere to coat the surface of the $LiFeSO_4F$ particles with the $LiCoO_2$ layer, thereby obtaining a positive electrode active material.

An average particle size of the particles and a thickness of the coating layer were measured for the positive electrode active materials of the Examples and Comparative Examples by TEM observation. The results are shown in Table 1 below. In Table 1, a ratio of the particles to the coating layer (% by mass) are also shown. The positive electrode active materials obtained in Examples and Comparative Examples were allowed to stand in air for 48 hours, and whether or not deliquescence occurred was observed.

Using the positive electrode active materials from Examples and Comparative Examples, nonaqueous electrolyte secondary batteries were produced in the following method.

As a positive electrode active material, 8% by weight, based on the positive electrode, of graphite powder as a conductive material, and 5% by weight, based on the positive electrode, of PVdF as a binder were blended, and the mixture was dispersed in an n-methylpyrrolidone (NMP) solvent to prepare a slurry. After that, both sides of an aluminum alloy foil (99% purity) having a thickness of 15 μm were coated with the slurry, which was dried and pressed to produce a positive electrode.

As a negative electrode active material, $Li_4Ti_5O_{12}$ particles having a spinel structure were used. The negative electrode active material particles, a graphite powder having an average particle size of 5 μm and a BET specific surface area of 10 m²/g, and PVdF as a binder were blended in a weight ratio of 90:6:4, the mixture was dispersed in an n-methylpyrrolidone (NMP) solvent to prepare slurry, and the dispersion was stirred in a ball mile to prepare a slurry. An aluminum alloy foil (99% purity) having a thickness of 15 μm was coated with the obtained slurry, which was dried and pressed to produce a negative electrode.

Separately, a cellulose non-woven fabric separator having a thickness of 20 μm contacted with the positive electrode, and the positive electrode was coated with the separator. After that, the negative electrode was put thereon and, and at the same time, the negative electrode was provided to be opposed to the positive electrode through the separator, which was spirally wound to produce an electrode group. The resulting electrode group was pressed to form a flat shape. The electrode group was housed in a thin metallic can (container) formed of an aluminum alloy (Al purity of 99%) having a thickness of 0.3 mm.

As a nonaqueous electrolyte, 1.0 mol/L of $LiPF_6$ as an electrolyte was dissolved in a mixed solvent of diethyl carbonate (DEC) and propylene carbonate (PC) (volume ratio of 80:20) to prepare a liquid nonaqueous electrolyte (nonaqueous electrolytic solution). The nonaqueous electrolyte was poured into the electrode group in the container, thereby producing a thin nonaqueous electrolyte battery having a thickness of 4 mm, a width of 30 mm, and a height of 60 mm.

A discharge capacity and capacity maintenance rate after 100 cycles of the obtained batteries obtained in Examples and Comparative Examples were measured in the following conditions, and the results are shown in Table 2.

Measurement Conditions of Discharge Capacity: A capacity per weight of the positive electrode active material was measured at the time when the battery was charged at a constant current of 1 C rate up to a voltage of 2.8 V in an environment of 25° C., then was charged in a constant voltage mode until the current value was reduced, and was discharged at a constant current of 0.2 C rate to 1.0 V from the fully charged state.

Measurement Conditions of Capacity Maintenance Rate after 100 Cycles: A capacity per weight of the positive electrode active material was determined as a capacity in a first cycle at the time when the battery was charged at a constant current of 1 C rate up to a voltage of 2.8 V in an environment of 25° C., then was charged in a constant voltage mode until the current value was reduced, and was discharged at a constant current of 0.2 C rate to 1.0 V from the fully charged state. The charge and discharge were repeated for 98 cycles in the same manner as above except that the rate at discharge was changed to 1 C. After that, the charge and discharge was performed in the same manner as in the first cycle, and a capacity was measured at the 100th cycle. A capacity maintenance rate after 100 cycles was calculated as a capacity ratio of the capacity at the 100th cycle to that at the first cycle.

TABLE 1

|  | First compound | Crystal structure | Average particle size (μm) | Second compound | Thickness | Ratio of particles to coating layer (% by mass) |
|---|---|---|---|---|---|---|
| Example 1 | $LiFeSO_4F$ | Tavorite type | 1 | $LiFePO_4$ | 10 nm | 97:3 |
| Example 2 | $LiFeSO_4F$ | Tavorite type | 0.1 | $LiFePO_4$ | 10 nm | 75:25 |
| Example 3 | $LiFeSO_4F$ | Tavorite type | 10 | $LiFePO_4$ | 10 nm | 99.7:0.3 |
| Example 4 | $LiFeSO_4F$ | Tavorite type | 1 | $LiFePO_4$ | 1 nm | 99.7:0.3 |
| Example 5 | $LiFeSO_4F$ | Tavorite type | 1 | $LiFePO_4$ | 1 μm | 13:87 |
| Example 6 | $LiFe_{0.9}Mn_{0.1}SO_4F$ | Triplite type | 1 | $LiFePO_4$ | 10 nm | 97:3 |
| Example 7 | $LiFe_{0.9}Zn_{0.1}SO_4F$ | Triplite type | 1 | $LiFePO_4$ | 10 nm | 97:3 |
| Example 8 | $LiFeSO_4F$ | Tavorite type | 1 | $LiFe_{0.5}Mn_{0.5}PO_4$ | 10 nm | 97:3 |
| Example 9 | $LiFeSO_4F$ | Tavorite type | 1 | $LiFe_{0.5}Co_{0.5}PO_4$ | 10 nm | 97:3 |
| Example 10 | $LiFeSO_4F$ | Tavorite type | 1 | $LiFe_{0.5}Mg_{0.5}PO_4$ | 10 nm | 97:3 |
| Example 11 | $LiFeSO_4F$ | Tavorite type | 1 | $LiFePO_4$ | 10 nm | 97:3 |
| Comparative Example 1 | $LiFeSO_4F$ | Tavorite type | 1 | None | — | — |
| Comparative Example 2 | $LiFe_{0.9}Mn_{0.1}SO_4F$ | Triplite type | 1 | None | — | — |
| Comparative Example 3 | $LiFe_{0.9}Zn_{0.1}SO_4F$ | Triplite type | 1 | None | — | — |
| Comparative Example 4 | $LiFeSO_4F$ | Tavorite type | 1 | $LiFePO_4$ | — | — |
| Comparative Example 5 | $LiFeSO_4F$ | Tavorite type | 1 | $LiCoO_2$ | 10 nm | 96:4 |

TABLE 2

|  | Whether or not deliquescence occurred | Discharge capacity (mAh/g) | Capacity maintenance rate after 100 charge and discharge cycles |
|---|---|---|---|
| Example 1 | No | 115 | 93 |
| Example 2 | No | 121 | 91 |
| Example 3 | No | 103 | 96 |
| Example 4 | No | 116 | 88 |
| Example 5 | No | 125 | 99 |
| Example 6 | No | 101 | 88 |
| Example 7 | No | 100 | 89 |
| Example 8 | No | 113 | 92 |
| Example 9 | No | 114 | 91 |
| Example 10 | No | 110 | 93 |
| Example 11 | No | 130 | 98 |
| Comparative Example 1 | Yes | 88 | 54 |
| Comparative Example 2 | Yes | 81 | 48 |
| Comparative Example 3 | Yes | 79 | 49 |
| Comparative Example 4 | Yes | 86 | 62 |
| Comparative Example 5 | Decomposed | 10 | 0 |

As shown in Table 1 and Table 2, in the positive electrode active materials of Examples 1 to 10, no deliquescence was observed, but the positive electrode active materials of Comparative Examples 1 to 4 deliquesced. It can be considered that the positive electrode active materials of Comparative Examples 1 to 3 did not have the coating layer, and thus deliquescence occurred. It can also be considered that when the first compound particles was mixed with the second compound particles, as in Comparative Example 4, the second compound adhered to the surface of the first compound particles, but because most of the surface of the first compound particles were exposed, deliquescence occurred. In Comparative Example 5, the first compound particles were thermally decomposed by the heat-treatment for forming the $LiCoO_2$ layer.

According to the positive electrode active material of at least one of the embodiments and Examples described above, because at least one part of the surfaces of the particles containing the first compound represented by the general formula $LiMSO_4F$ wherein M is at least one element selected from the group consisting of Fe, Mn, and Zn is coated with the coating layer containing the second compound represented by the general formula $LiM'PO_4$ wherein M' is at least one element selected from the group consisting of Fe, Mn, Co, and Mg, the deliquescence reaction is suppressed, and positive electrode active material capable of improving the energy density and the charge and discharge cycle performance of the nonaqueous electrolyte battery can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positive electrode active material comprising particles comprising a first compound represented by the general formula $LiMSO_4F$ wherein M is at least one element selected from the group consisting of Fe, Mn, and Zn; and
   a coating layer, which coats at least one part of surfaces of the particles and comprises a second compound represented by the general formula $LiM'PO_4$ wherein M' is at least one element selected from the group consisting of Fe, Mn, Co, and Mg.

2. The positive electrode active material according to claim 1, which further comprises a carbon-containing layer which coats at least one part of a surface of the positive electrode active material.

3. The positive electrode active material according to claim 1, wherein the particles have an average particle size in a range of from 0.1 μm to 10 μm.

4. The positive electrode active material according to claim 1, wherein the coating layer has a thickness in a range of from 1 nm to 1 μm.

5. The positive electrode active material according to claim 1, wherein the particles have an average particle size in a range of from 0.1 μm to 1 μm and the coating layer has a thickness in a range of from 10 nm to 100 nm.

6. The positive electrode active material according to claim 1, wherein an amount of the coating layer is from 0.5% by mass to 20% by mass based on 100% by mass of the positive electrode active material.

7. A nonaqueous electrolyte battery comprising a positive electrode comprising the positive electrode active material according to claim 1;
   a negative electrode; and
   a nonaqueous electrolyte.

8. The battery according to claim 7, wherein the negative electrode comprises at least one selected from a group consisting of a lithium-titanium oxide, a titanium oxide, and a niobium-titanium composite oxide.

9. The battery according to claim 7, wherein the negative electrode comprises a lithium-titanium oxide having a spinel structure.

10. The battery according to claim 7, wherein the negative electrode comprises monoclinic $TiO_2$.

11. The battery according to claim 7, wherein the negative electrode comprises $Li_xNb_aTi_bO_c$ wherein $0 \leq x \leq 3$, $0 < a \leq 3$, $0 < b \leq 3$, and $5 \leq c \leq 10$.

12. The battery according to claim 11, wherein a part of Nb atoms or a part of Ti atoms in the $Li_xNb_aTi_bO_c$ is substituted by at least one element selected from a group consisting of V, Zr, Ta, Cr, Mo, W, Ca, Mg, Al, Fe, Si, B, P, K, and Na.

13. A battery pack comprising the nonaqueous electrolyte battery according to claim 7.

* * * * *